United States Patent Office 2,723,949
Patented Nov. 15, 1955

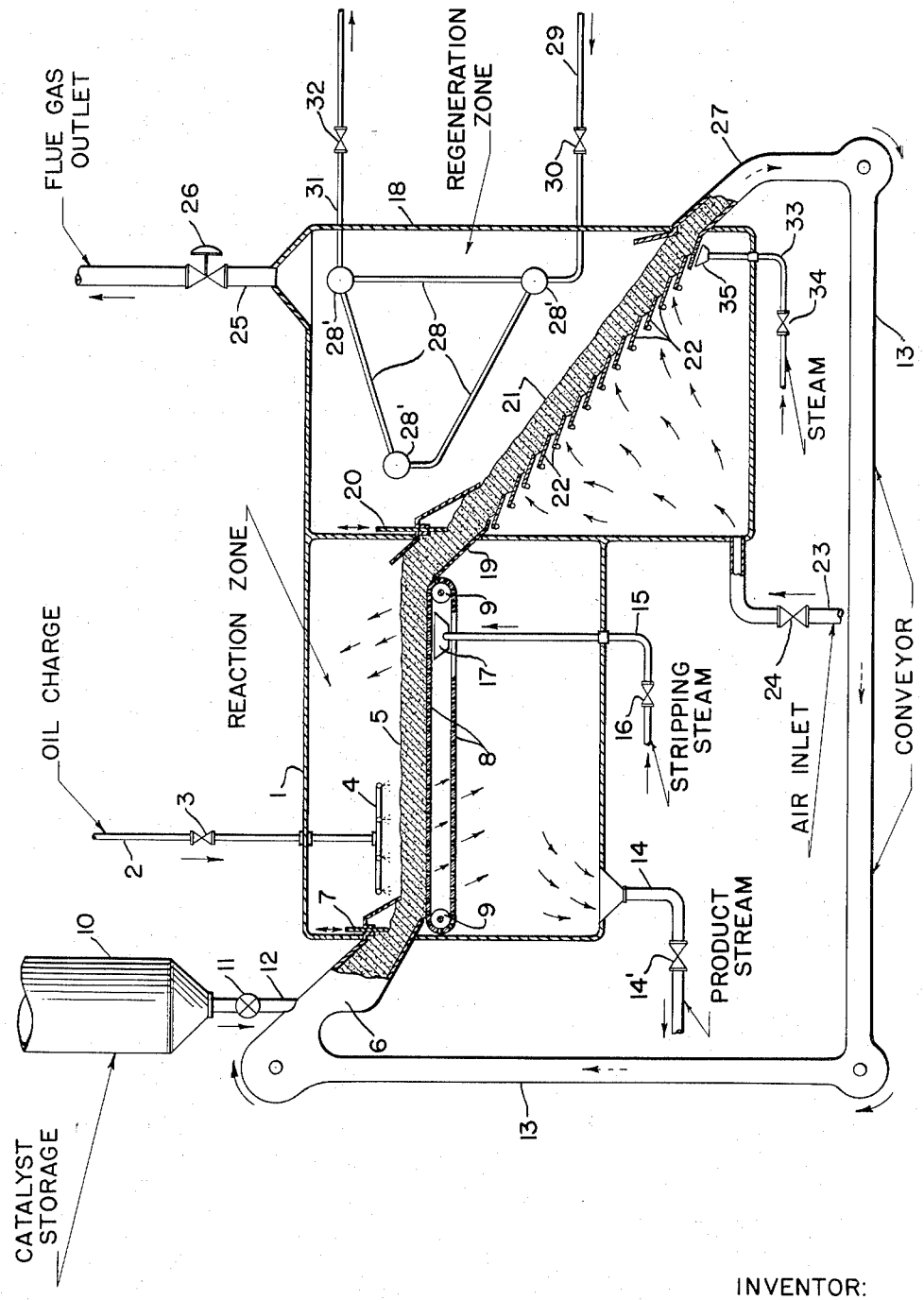

2,723,949

METHOD AND APPARATUS FOR CONVERTING A HYDROCARBON OIL STREAM IN THE PRESENCE OF A RELATIVELY THIN MOVING PARTICLE BED

John Woods McCausland, Chicago, Ill., assignor to Universal Oil Products Company, Chicago, Ill., a corporation of Delaware Application October 31, 1951, Serial No. 254,124

5 Claims. (Cl. 196—52)

The present invention relates to an improved method and means for effecting the conversion of a reactant medium, such as a hydrocarbon stream, in the presence of a moving bed of subdivided solid particles. More specifically, the improvement is directed to a continuous conversion process having subdivided catalyst particles passing through one or more of the conversion zones in a substantially uniform and relatively thin bed, and a reactant stream passed substantially transversely through the bed.

The present moving bed system is adapted to provide a continuous cyclic operation, such as in a catalytic conversion process having catalyst particles pass successively through a reaction zone and a separately confined regeneration zone, wherein the particles may be reactivated, and from which the particles are returned to the reaction zone for reuse therein. Although the present cyclic operation is particularly useful in connection with the catalytic cracking of an oil stream, the operation and arrangement may well be used for other conversion processes, such as for dehydrogenation, catalytic reforming, and the like, or in another instance, subdivided coke particles may be circulated to provide a continuous coking operation for converting relatively heavy oil streams. In other words, the use of the present relatively thin moving bed of particles is adaptable to the various continuous conversion operations that are presently used in connection with the fluidized and moving bed catalytic operations, now well known to those who are connected with the petroleum and chemical arts.

By passing catalyst particles through a conversion and/or a regeneration zone in a uniform relatively thin bed or layer, it is possible to maintain a close control and regulation of the quantity of catalyst within the conversion zone, as well as regulation of the rate of movement. Also, where the catalyst is maintained in a relatively thin bed, it is possible to obtain relatively low pressure drops in passing a fluid reactant stream through the material and thus maintain a relatively low over-all pressure system. In the usual catalytic moving bed operation, the catalyst particles pass downwardly through tall contacting chambers and there are relatively deep beds of the material which in turn can cause relatively high pressure drops in effecting the passage of a fluid medium through the catalyst bed. The fluidized contacting and transfer of finely divided catalyst particles provides, in general, a desirable continuous cyclic conversion system, however, this type of operation sometimes requires relatively high inventories of catalyst within the contacting zones. Also, there is some disadvantage to a fluidized bed operation, in that some of the finely divided particles may be retained longer in a contacting zone than other particles. In other words, it is not easy to control the residence time of all of the finely divided particles in each of the contacting zones in any direct manner.

It is a principal object of the present invention to provide an improved moving bed operation for effecting the contacting and transfer of subdivided catalyst particles through one or more beds of a continuous multiple zone conversion unit.

It is another object of the present invention to provide for a controlled movement of catalyst particles in a relatively uniform and thin bed thereof, whereby the particles pass through the conversion zone at controlled flow, or rate of movement, and a fluid reactant stream may pass through the bed while sustaining only a relatively low pressure drop.

Still another object of the present invention is to provide a conversion zone which is of the boiler type of construction, particularly with respect to the regenerating zone, with the catalyst particles moving through the zone in a relatively thin unbroken bed and supported on perforate plate or grating means permitting a reactant stream or reactivating gas to pass transversely through the bed.

In a broad aspect, the present invention provides a moving bed operation wherein subdivided solid particles are passed cyclically through two or more conversion zones of a processing unit, with the subdivided solid particles aiding in the conversion of a fluid reactant stream in one zone and being heated and/or reactivated by a different fluid medium in a different contacting zone, with the improvement comprising, passing the subdivided solid particles in a continuously moving relatively thin and uniform layer thereof through at least one of the contacting zones and effecting the contacting of the particles with one of the fluid mediums.

In a catalytic conversion operation, the particles may be formed of subdivided catalyst, preferably in a spherical form, and the particles may be passed through the particular conversion zone in a relatively thin layer or bed on a perforate plate or grating, so that the fluid contacting medium may pass transversely through the bed of particles. It is, however, not intended to limit the transporting of the solid particles in the continuous layer by any one method or means. For example, the particles may be carried substantially horizontally or laterally by a moving belt of chain grate type of apparatus, which in turn is formed of a continuous belt or conveyor means extending over rollers and a driving arrangement, or alternately, the subdivided particles may be moved in a descending and sloping bed, passing downwardly over perforate grid, or an overlapping plate arrangement. Downwardly sloping and overlapping plate sections may also be provided with mechanical means which slightly raises and lowers the plates and in turn agitates them so that the bed continuously moves, as desired, through the particular conversion zone in a downwardly sloping bed of substantially uniform thickness.

A desirable processing operation provides for passage of the catalyst particles, as for example, in a hydrocarbon cracking operation, through adjacent reaction and regeneration zones, and with the particles maintained in a relatively thin and uniform layer moving continuously through both of the conversion zones. Suitable conveyor means, or fluidized transporting means may be provided for carrying the catalyst particles from the outlet end of one zone to the inlet end of the other, in order that a cyclic operation may be maintained. However, preferably, the different contacting zones are directly adjacent one another so that the moving bed of particles may pass as a substantially uniform layer and in a substantially unbroken stream through the reaction and regeneration zones, and also preferably the arrangement is such that the hot particle bed passes directly to the reaction zone without going through conveyor or transfer means. One particular advantage of the present type of moving bed operation is that a liquid hydrocarbon stream may be distributed or sprayed into direct contact with the catalyst particles, without effecting the prior vaporization of the hydrocarbon charge stream. Thus, where catalyst moves in a relatively thin bed over perforate supporting means through the reaction zone, the oil charge may be sprayed to the top of the catalyst bed near the inlet end of the reaction zone and if desired the resulting hydrocarbon product vapors may be withdrawn from a lower portion of the reaction zone, below the moving bed of particles, such that there is a vapor flow transversely through the catalyst bed to suitable outlet means. Steam or other suitable stripping medium may be passed into contact with the moving bed of particles near the outlet end of the reaction zone in order that occluded and absorbed hydrocarbons may be stripped and removed from the particles prior to their discharge into a regeneration zone.

The present moving bed arrangement is also particularly adapted for use in a regeneration zone, in that it permits the construction of a rectangular form of housing or heating chamber, rather than the use of cylindrical pressure vessel type of construction. A plurality of tubes or heat exchange coils may be placed within the regeneration zone in order that resulting hot combustion gases may have indirect contact with the cooling medium passing through the coils and thus provide means for extracting heat from the combustion gas stream prior to discharging it from the regeneration zone. For example, water or low pressure steam may be passed through suitable tubular heat exchange coils in the upper portion of the regeneration zone and provide a desirable waste heat boiler arrangement.

Thus, in a somewhat more specific embodiment, the present invention provides a continuous method of catalytically converting a hydrocarbon reactant stream in a manner which comprises, passing subdivided solid particles through a confined reaction zone and contacting them therein with a hydrocarbon reactant stream, continuously withdrawing a resulting vaporous product stream from the zone while continuously transferring the contacted catalyst particles therefrom into a confined regeneration zone, passing the catalyst particles through the latter zone in a continuously moving relatively thin uniform bed of particles being maintained over perforate supporting means, introducing a free oxygen containing gaseous medium into contact with the moving bed of particles, and effecting the burning and removal of contaminating carbonaceous matter therefrom, passing resulting hot combustion gases from above the moving bed of particles into indirect heat exchange relationship with a cooling medium passing through the regeneration zone and thereby extracting heat from the combustion gases prior to discharging them from the regeneration zone, and continuously discharging and returning resulting reactivated catalyst particles from the regeneration zone to the reaction zone.

In some instances, cooling fins, heat exchange tubes, etc., may be placed and used directly above the perforate support means in the regeneration zone in order to provide cooling and temperature control within the particle bed itself. For example, where it is desirable to limit carbon burning and effect a catalyst circulation with some residual carbon deposit, such cooling may be incorporated. As hereinbefore noted, it is also advantageous to pass the catalyst particles in a relatively thin bed through the reaction zone as well as the regeneration zone, thus, in still another embodiment of the present invention, there is provided a continuous method for catalytically converting a hydrocarbon reactant stream which comprises, continuously passing subdivided catalyst particles through a confined reaction zone in a relatively thin uniform bed maintained over perforate supporting means and spraying the particles with a liquid hydrocarbon stream, continuously withdrawing a resulting vaporous product stream from the reaction zone while continuously transferring the contacted catalyst particles therefrom into a confined regeneration zone, passing the contacted catalyst particles through the latter zone in a continuously moving relatively thin bed maintained over perforate support means, introducing a gaseous regenerating medium through the supporting means and into contact with the moving bed of particles and effecting the removal of contaminating carbonaceous matter therefrom, passing resulting hot combustion gases from above the moving bed of catalyst particles into indirect heat exchange relationship with a cooling medium passing through the upper portion of the regeneration zone and effecting the cooling of the combustion gases prior to discharging them therefrom, and continuously discharging and returning resulting reactivated catalyst particles from the regeneration zone to the reaction zone.

The catalyst to oil ratio, which is the relation of the rate of oil entering the reactor to the rate of catalyst entering the reactor at any one time, and space velocity, which is defined as the number of pounds of oil per hour to the reaction zone, to the number of pounds of catalyst maintained therein, may be varied in the conversion zone by regulating the thickness of the bed of catalyst particles which passes through the zone, as well as by the rate of movement of the bed. The control of the rate of movement of the particles will of course depend upon specific construction details relating to the transporting or supporting means for the particles in a moving bed, and upon the means for feeding and regulating the depth of the bed at the inlet end of each conversion zone.

It may also be noted that substantially all of the particles are utilized to a high degree in each of the contacting zones, and as a result, a relatively low catalyst inventory may be maintained within the system and within each of the conversion zones to effect a desired degree of total conversion. A relatively thin moving bed, as briefly noted hereinbefore, is of advantage in that the unit can operate at relatively low pressure drop through each contacting zone and thus maintain a relatively low operating pressure for the entire system.

Reference to the accompanying drawing of the following description thereof will serve to clarify the present moving bed operation, while additional advantages and features in the operation and construction will be noted in connection therewith.

Referring now to the drawing, there is shown a chamber 1 indicated as a reaction zone and suitable for effecting the catalytic conversion of a reactant stream. In the following description it will be assumed that a hydrocarbon gas-oil stream, in liquid phase, is being introduced by way of line 2 and valve 3 into the interior of the reaction zone 1 and therein distributed by way of a header or spraying means 4 on to a continuously moving bed of catalyst particles 5, and that the oil stream undergoes catalytic cracking in the presence of a suitable catalyst maintained under suitable cracking conditions. Also, as noted briefly hereinbefore, the catalyst particles are preferably spherical or of a size and shape that will readily flow and move in a descending gravity flow, as well as move by mechanical means. The catalyst may consist predominately of a metal or one or more metal oxides, such as alumina, zirconia, magnesia, and the like, formed to a desired size, or alternatively, the catalyst may comprise a form of crushed granular material prepared from a naturally occurring mineral. It is preferable to have the particles of a relatively uniform and well-graded size in order to avoid attrition of the particles and the presence of substantially large quantities of fine particles of a powdery or dusty nature.

The present embodiment provides for the continuous cyclic movement of the catalyst particles through the entire unit. Thus, heated and reactivated catalyst particles are introduced into reaction chamber 1 by way of an inlet conduit 6 and a suitable vertically sliding gate 7, which in turn regulates the quantity of catalyst entering the reaction zone as a relatively thin moving bed, by virtue of controlling the thickness of the bed as it moves through the reaction zone on a continuous grid or grating 8. The latter is indicated diagrammatically as a continuous perforate grid or grate moving over driven rollers 9 in the manner of a conveyor belt or a chain grate stocker arrangement. Fresh catalyst may be charged to the unit, for start up purposes, or for adding the inventory, from a suitable catalyst storage hopper 10 and by way of the feeder 11 and conduit 12, which in turn connects with and discharges into the reactor inlet 6. The present drawing indicates a conveyor 13, such as the Redler type of conveyor, for carrying the particles to the reaction zone. However, a fluidized transfer, or other mechanical type of conveying means may be utilized, in lieu of the conveyor indicated on the present drawing, for returning catalyst particles to the reaction zone.

The gas-oil charge stream, distributed from the header or spray means 4 on to the moving bed of catalyst 5, is subjected to vaporization and catalytic cracking so that resulting product vapors may be removed from below the conveyor 8 by way of a product stream outlet conduit 14 and valve 14', for subsequent transfer to a suitable fractionating or recovering zone, which is not indicated in the present drawing. It is of course not intended to limit the use of the moving thin bed of catalyst to an operation which utilizes a liquid charge, nor to a down draft flow of the product vapor stream through the bed. The hydrocarbon charge stream may if desired be passed into contact with the moving catalyst bed 5 from below the bed and the perforate grid or grating 8 such that the product vapor stream is withdrawn from above the moving bed 5 and from the top of the reaction zone 1, or alternatively, a reversing flow, multiple stage contact, may be made with the resulting vapors being baffled downwardly and upwardly through the bed such that the product stream is also taken from the upper portion of the reaction chamber 1. The hydrocarbon oil charge stream may also be preheated, or heat exchange means provided, to permit the introduction of a vapor stream into contact with the catalyst, instead of the liquid charge being distributed or sprayed onto the catalyst particles.

Stripping steam is introduced into the reaction chamber 1 by way of line 15, valve 16, and distributing means 17, which in the present embodiment, is indicated as discharging the steam directly under the moving grid 8 and below the bed of catalyst 5, at the zone of the catalyst discharge from the reaction zone 1. Thus, occluded and absorbed hydrocarbon vapors may be stripped from the catalyst prior to its introduction into a regenerating chamber 18. The steam and stripped material is withdrawn from the reaction chamber along with the product stream passing by way of outlet 14.

Contacted catalyst particles are indicated in the present drawing as passing in a descending gravity flow over plate 19 at the outlet end of the reaction zone 1 and below a vertically sliding gate 20, which is preferably adjustable from the exterior portion of the regenerating chamber 18 and provides means for regulating the flow of catalyst from the reaction zone as well as means for regulating the depth of the moving bed of catalyst particles. In general, it is desirable that the reaction zone 1 and the regeneration zone 18 are directly adjacent one another so that the contacted catalyst may go directly from one zone to the other without loss of heat and without the use of any unnecessary transfer conduits, conveyors, or other means for moving catalyst from one zone to another.

In the present embodiment, the catalyst particles pass in a relatively thin layer or bed 21 and in a continuous descending flow over a plurality of overlapping plate members 22, which are indicated as being spaced slightly one above another such that a regenerating air stream may pass therebetween and into the descending catalyst bed from the lower side to effect the desired burning and removal of carbonaceous matter from the particles. The air or oxygen containing stream for the regeneration of the catalyst particles in a cracking operation, such as being described here, is introduced into the lower portion of the reaction chamber 18 by way of line 23 and valve 24. Thus, the air or oxygen stream passes upwardly and transversely through the relatively thin bed of catalyst as the latter moves continuously downwardly over the plates 22 and resulting combustion gases collect above the bed 21 within the upper portion of regeneration zone 18, whereby these gases may be discharged by way of stock 25 and control valve 26.

It is a particularly advantageous feature to have the regeneration stream pass transversely through a relatively thin layer of catalyst material whereby the latter is regenerated substantially uniformly with a minimum pressure drop. This same advantage is of course obtained in the reaction chamber 1 where the hydrocarbon reactant stream contacts the catalyst particles as they are moving in the relatively thin bed 5 which permits the resulting vapor stream to pass therethrough with a low pressure drop.

Reactivated catalyst particles from the descending bed 21 are passed from the regeneration zone 18 by way of outlet conduit 27, which in turn feeds the particles at a high temperature into the inlet end of conveyor 13, whereby they are carried to the inlet conduit 6 for the reaction zone 1. In the present embodiment, the catalyst particles are carried at a high temperature suitable for effecting catalytic cracking in the reaction zone, it is therefore desirable that the conveyor means 13 be as short as possible and insulated in order to prevent excessive heat loss from the catalyst particles during their recycle to the conversion zone. The conveying means shown is of course diagrammatic.

In an alternative arrangement, the outlet end of the regenerating chamber 18 may be placed directly adjacent a reaction chamber, such as 1, whereby regenerated catalyst particles are fed directly into the conversion zone through a feed gate or sloping perforate means and as the sloping plates 22, with a minimum transporting of the high temperature catalyst particles. Thus, the contacted and cooler catalyst particles being discharged from the conversion zone may be recycled through fluidized transporting or mechanical conveying equipment to the inlet end of the regenerating zone. Actually, this alternative arrangement is preferable from the standpoint of conserving heat and at the same time it permits conveying a cooler material.

Another advantageous feature of the present invention, where the catalyst passes through successive contacting zones in a relatively thin continuously moving bed, is the positioning of boiler type tubes 28 and suitable tube heaters 28' which in turn connect with suitable fluid inlet and outlet means, such as provided by conduit 29 with valve 30, and outlet conduit 31 with valve 32. This arrangement provides means for cooling the combustion gases formed in the regenerating operation and extracting heat from the regenerating chamber 18 by the generation of steam, or heat exchange with a fluid medium other than water or steam. In other words, a boiler tube arrangement is made in combination with the regenerating chamber and the resulting hot combustion gases are cooled prior to their discharge from the regenerating chamber 18 by way of the outlet conduit 25. Where steam is generated in the boiler tubes 28, a portion of the steam may be used advantageously for stripping particles in the reaction zone being introduced by way of the conduit 15. Also, stripping of particles in the regeneration zone may be effected by steam from line 33 and valve 34 discharging through suitable distributing means 35 into the catalyst bed 21, prior to the discharge of the latter from the regeneration zone into conduit 27. However, steam from another source, or another inert stripping medium, such as, nitrogen or $CO_2$ may well be used for the stripping step in each of the contacting chambers.

It may also be pointed out, that the thin moving bed of catalyst may move in a descending flow through both of the contacting zones whereby it is unnecessary to use a conveyor arrangement such as provided by the continuous grid or grate arrangement 8 and rollers 9 in the reaction chamber 1, or alternatively, the continuous moving grate and pulley arrangement may be utilized in the regenerating chamber 18 in lieu of the sloping and overlapping plate arrangement that is provided by the plurality of plates 22, so that the continuous movement of the particles is not dependent upon the descending flow of the material. A sloping perforate plate or an overlapping plate arrangement, as provided by the plurality of plates 22 in the regenerating chamber 18, is of advantage in that it eliminates the continuous belt arrangement and the driving means necessary for maintaining the conveyor belt. A desirable construction also provides means for agitating the grid plates 22 for the descending bed of catalyst, in order that the continuous gravity flow of the latter is insured. For example, each of the overlapping plate members 22 may have suitable pivoting means at their upper edges whereby each one may be raised and lowered a slight amount at its lower edge, or jarred, or otherwise agitated, such that the layer of catalyst does not stop or pile up at any one zone as it moves continuously through the regenerating chamber.

A particularly advantage obtained by the present method of operation, having the relatively thin bed of moving catalyst particles, is the accompanying low pressure drops. The reactant streams may be introduced into the contacting chambers at relatively low pressures and the chambers may be constructed more in the manner of furnaces or boilers. In other words, the contacting chambers may, in general, be of a rectangular shape, rather than of the circular pressure chamber type of construction, with the width and length of each of the chambers being governed by desired conversion capacities. Preferably, the contacting chambers are relatively long and narrow such that the moving catalyst bed does not have too great a width and can readily maintain a substantially uniform thickness, as it passes in a descending gravity flow, or alternatively is carried on a grating in the manner of a stoker, or conveyor belt arrangement. A relatively narrow construction also permits the catalyst particles to be more readily passed from the plate or grating means into the conveying means, which maintains the cyclic movement of the catalyst particles through an entire unit.

A single conversion zone of the type provided by the present invention with a thin moving bed of particles, may also be combined with a vertical vessel or vertical kiln type of contacting zone, wherein particles descend substantially vertically therethrough, either concurrently or countercurrently to a reactant stream.

I claim as my invention:

1. A continuous method for catalytically converting a hydrocarbon reactant, which comprises, continuously passing subdivided catalyst particles in a relatively thin uniform bed thereof through a confined reaction zone in a substantially horizontal direction, introducing said hydrocarbon reactant to one side of said bed and passing the same transversely through the bed in a substantially vertical direction, withdrawing a resulting vaporous product stream from the opposite side of said bed and from said zone while continuously transferring the contacted catalyst particles from the reaction zone into a confined regeneration zone, passing the catalyst particles through said regeneration zone and contacting them with an oxygen containing gaseous regenerating medium to effect the burning and removal of carbonaceous contaminating matter from said particles, discharging resulting hot combustion gases from said regeneration zone while continuously withdrawing resulting reactivated catalyst particles from the last mentioned zone and returning them to said reaction zone for reuse therein.

2. The method of claim 1 further characterized in that said contacted catalyst particles move in a relatively thin bed in a continuously descending gravity flow through said regeneration zone over sloping perforate supporting means, and said gaseous regenerating medium is introduced into contact with said descending bed of catalyst particles in a manner providing for the substantially transverse flow of said medium through said relatively thin bed of catalyst.

3. The method of claim 1 further characterized in that said hydrocarbon reactant is supplied to the upper side of said relatively thin moving bed of catalyst particles as a liquid medium, and resulting vapors and conversion products are passed downwardly through said moving bed of catalyst particles in a flow substantially transverse to the direction of flow of the moving bed of particles, whereby said resulting product stream may be withdrawn from the lower portion of said confined reaction zone.

4. A unitary apparatus for effecting the conversion of a reactant stream in the presence of a moving bed of subdivided solid particles, which comprises in combination, a confined conversion chamber having a particle inlet at one end thereof and a particle outlet at the other end thereof, perforate particle supporting means extending laterally between said particle inlet and said particle outlet and adapted to carry a relatively thin uniform bed of particles thereon, means for moving said perforate support between said inlet and outlet, a vertically sliding gate member at the particle inlet to said chamber adapted to regulate the thickness of said particle bed moving across said particle supporting means, fluid inlet and distributing means extending into the interior of said conversion chamber above said perforate particle supporting means, a vapor outlet from the lower portion of said conversion chamber, a confined regeneration chamber positioned adjacent said conversion chamber and connected therewith, said regeneration chamber having a particle inlet connecting with said particle outlet of said conversion chamber, a regenerated particle outlet from said regeneration chamber, inclined stationary perforate particle supporting means extending laterally across said regeneration chamber from said particle inlet thereof to said particle outlet, a gas inlet connecting to said regeneration chamber from below said inclined supporting means, a gas outlet from said regeneration chamber from above said inclined supporting means, and particle transporting means extending from said regenerating chamber particle outlet to said particle inlet of said conversion chamber.

5. The unitary apparatus of claim 4 further characterized in that tubular fluid heat exchange means extends across the upper portion of said regenerating chamber, whereby hot combustion gases from said chamber pass in indirect heat exchange relationship with a fluid medium passing through said heat exchange means and cools hot gases passing outwardly through said gas outlet from said regenerating chamber.

References Cited in the file of this patent

UNITED STATES PATENTS

| | | |
|---|---|---|
| 2,064,715 | Atwell | Dec. 15, 1936 |
| 2,239,801 | Voorhees | Apr. 29, 1941 |
| 2,499,304 | Evans | Feb. 28, 1950 |
| 2,529,366 | Bauer | Nov. 7, 1950 |